United States Patent [19]

Yamashita et al.

[11] Patent Number: 5,046,171
[45] Date of Patent: Sep. 3, 1991

[54] WELDING PATTERN FOR A CLEANER LINER IN A MAGNETIC DISK CARTRIDGE

[75] Inventors: Kazuhiko Yamashita; Tadashi Saito, both of Utsunomiya, Japan

[73] Assignee: Kao Corporation, Tokyo, Japan

[21] Appl. No.: 460,375

[22] Filed: Jan. 3, 1990

[30] Foreign Application Priority Data

Jan. 19, 1989 [JP] Japan ................................ 1-4951
Mar. 29, 1989 [JP] Japan ................................ 1-36190

[51] Int. Cl.⁵ .............................................. G11B 23/03
[52] U.S. Cl. .................................... 360/133; 206/444
[58] Field of Search ................... 360/137, 133, 128; 206/313, 444

[56] References Cited

U.S. PATENT DOCUMENTS 4,392,170  7/1983  Okada ................................. 360/133
4,734,815  3/1988  Naganawa et al. ................ 360/133
4,803,584  2/1989  Doi et al. ............................ 360/133

FOREIGN PATENT DOCUMENTS 0308161  3/1989  European Pat. Off. ............ 360/133
0013484  1/1986  Japan .................................... 360/133

Primary Examiner—John H. Wolff
Assistant Examiner—Craig A. Renner
Attorney, Agent, or Firm—Birch, Stewart, Kolasch & Birch

[57] ABSTRACT

A magnetic disk cartridge has a case on which a transducer access rectangular opening is formed, a magnetic disk accommodated in the case, and liners partly welded to the inner surfaces of the case in order to clean the surfaces of the magnetic disk. The magnetic disk cartridge is characterized in that the liners are welded to the inner surfaces of the case through a welding pattern. The welding pattern comprises a discontinuous line extending along the edge of the liner and a straight line intersecting with the discontinuous line but not extending to overlay the effective magnetic recording area.

22 Claims, 4 Drawing Sheets

WELDING PATTERN FOR A CLEANER LINER IN A MAGNETIC DISK CARTRIDGE

BACKGROUND OF THE INVENTION

1. Field of the Invention

This invention relates to a magnetic disk cartridge and particularly to a welding pattern of cleaning liners to the inner surfaces of a case.

2. Description of the Prior Art

A conventional welding pattern of cleaning liners in a magnetic disk cartridge will be described with reference to FIGS. 5 to 7.

As shown in FIG. 5, the magnetic disk cartridge includes a case 1 comprising a bottom member 11 and a cover member 12 and a magnetic disk rotatably disposed within the case 1. And liner 2, 2 (cf. FIGS. 6 and 7) for cleaning the surfaces of said magnetic disk are attached to the respective inner surfaces of the bottom member 11 and the cover member 12. The liners 2, 2 are attached to the respective members in the same welding pattern. 4 is a shutter.

The welding pattern of the liners 2, 2 against the respective inner surfaces of the bottom member 11 and the cover member 12 in the conventional magnetic disk cartridge will be concretely described hereinafter. However, as the liner 2 is attached against both members 11 and 12 in the same welding pattern as mentioned above, only the welding pattern of liner 2 against the bottom member 11 will be described and the welding pattern of liner 2 against cover member 12 will be omitted.

As shown in FIGS. 6 and 7, the bottom member 11 is provided with a hub access central opening 11A formed in its center and a transducer (not shown) access rectangular opening 11B formed in adjacent to the central opening 11A.

A liner 2 formed from a nonwoven fabric surrounding the central opening 11A is attached to a part of the inner surface of the bottom member 11 by heating, supersonic wave or the like. The liner 2 is cut out at a portion corresponding to the opening 11B and therefore has a generally C-shaped configuration. The liner 2 has a width enough for cleaning the surface of the magnetic disk. Both the upper and lower surfaces of the magnetic disk are covered with and sandwiched by the liners 2, 2 of the both members. As shown in FIGS. 6 and 7, only the inner surface of the bottom member 11 is attached with the press member 3 formed from a plastic sheet and covered by the liner 2.

The liner 2 has a welding area formed in the vicinity of its edge and partly welded. In the welding area, as is shown in FIG. 6, liner welding portions 2A directing toward the inner side of the liner 2 are formed at a generally equal distance along the edge.

Accordingly, as the liner 2 is welded to the inner surface of the bottom member 11 only at its edge portions, the central portion of the liner 2 is protruded. The magnetic disk contained in the case 1 is cleaned by this protuberance during reproducing and recording.

However, the conventional magnetic disk cartridge has a shortcoming in that the welding area of the liner 2 with respect to the case 1 reaches to an effective magnetic recording area of the magnetic disk and the effect of cleaning is sometimes decreased at this portion. Also, fins are sometimes formed in the welding portion 2A by the welding process. At that time, the effective magnetic recording area is sometimes damaged by contact with the fins. In order to prevent the occurrence of such damage as much a possible, there is a method in which each of the straight lines of the welding portion 2A is made short to form a narrow welding area. However, according to this method, there is such a fear as that the welding strength of the liner 2 with respect to the inner surface of the case 1 is reduced such that the liner 2 is apt to turn up during recording and reproducing of the magnetic disk. When the liner is turned up, the contact resistance between the liner and the magnetic disk becomes large and the rotational torque of the magnetic disk can fluctuate. In some instances, the liner 2 is fluffed due to friction between the liner 2 and the magnetic disk and fibers of the liner 2, i.e., nonwoven fiber fall out and stick to the surface of the magnetic disk. This causes a bad effect on the magnetic disk during recording and reproducing.

SUMMARY OF THE INVENTION

It is therefore the general object of the present invention to provide a magnetic disk cartridge in which the liners can be welded to both inner surfaces of the case (inner surfaces of bottom member 11 and cover member 12) with a sufficient strength such that the magnetic disk can effectively be cleaned by the liners without damaging the effective magnetic recording area.

The object of the present invention can be achieved by providing a magnetic disk cartridge including a case, a magnetic disk accommodated in said case, and a liner partly welded to each of the inner surfaces of said case for cleaning the surfaces of said magnetic disk, said magnetic disk cartridge being characterized in that said liners are welded to the inner surfaces of said case through a welding pattern comprising a discontinuous line extending along the edge of said liner and a straight line intersecting with said discontinuous line which do not reach to the effective magnetic recording area.

According to the magnetic disk cartridge of the present invention, as the liner is welded to the case through the welding pattern comprising a discontinuous line extending along the edge of the liner and a straight line intersecting with the discontinuous line which do not reach to the effective magnetic recording area of the magnetic disk, the liner can be welded to the case with sufficient strength. Accordingly, the protuberance of the liner is surely contacted with the entire effective magnetic recording area and the magnetic disk can be cleaned by the liner without damaging magnetic recording layer.

DETAILED DESCRIPTION OF THE PREFERRED EMBODIMENT

Figure 1:
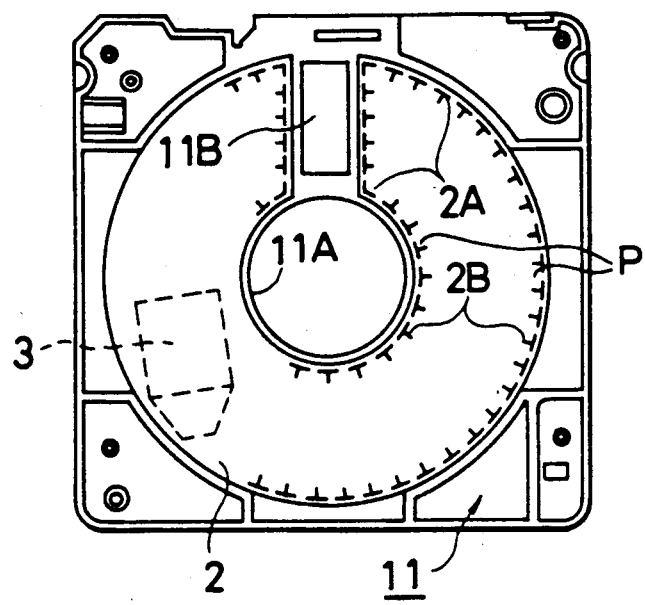
FIG. 1 is a plan view which shows a welding pattern of a liner mode for welding a liner as a first embodiment of a magnetic disk cartridge according to the present invention.

The gist of the features of the present invention will be described hereinafter with reference to the embodiments illustrated in FIGS. 1 through 4, wherein identical and similar parts are denoted by identical reference numerals.

The magnetic disk cartridge of the present invention, like the conventional magnetic disk cartridge, includes a case 1 provided with a transducer access rectangular opening, a magnetic disk accommodated in said case 1 and a liner 2 partly welded to the inner surface of said case 1 and adapted to clean the surface of said magnetic disk. However, the magnetic disk cartridge of the present invention is different from the conventional one in welding pattern of the liner 2 against the both inner surfaces of bottom member 11 and cover member 12 forming the case 1.

Therefore, only the welding pattern of the liner 2 against the both inner surfaces of the case 1 of the magnetic disk cartridge of the present invention will be described. Further, only the welding pattern of the liner 2 against the bottom member 11 will be described hereinafter, because the welding pattern of the liner 2 against the cover member 12 is performed in the same welding pattern as against the member 11.

A liner 2 of a magnetic disk cartridge of this embodiment, as shown in FIG. 1, is welded to the inner surface of the bottom member 11 through a welding pattern P which comprises a discontinuous line 2A extending along the edge of the liner 2 and a straight line 2B intersecting with the discontinuous line which does not reach to the effective magnetic recording area of the magnetic disk.

That is, the edge of the liner 2 is welded through the discontinuous line 2A, and the welding strength of the discontinuous line 2A is reinforced by means of welding of the straight line 2B intersecting with each component element line of the discontinuous line 2A. The straight line 2B, as apparent from FIG. 1, is generally perpendicular to each discontinuous line 2A at its center to form a T-shape configuration. In addition, the straight line 2B is sufficiently short as not to reach to the effective magnetic recording area of the magnetic disk.

Therefore, according to the magnetic disk cartridge of the present invention, as the welding pattern P does not reach to the effective magnetic recording area of the magnetic disk, when, if fins are generated when the liner 2 is welded to the case 1, the fins will never touch the effective magnetic recording area of the magnetic disk. As a consequence, the effective magnetic recording area is not damaged by the fins. Moreover, the welding portion of the welding pattern P is formed in a narrow range adjacent to a nonrecording portion of the magnetic disk in such a manner as to have a sufficient welding strength and the liner 2 is effectively protruded over the entire effective magnetic recording area. As a consequence, the liner 2 can exhibit an excellent cleaning performance. That is, according to the magnetic disk cartridge of this embodiment, the liner 2 holds a sufficient welding strength with respect to the case 1, namely the inner surface each of the bottom member 11 and the cover member 12, and can effectively clean the magnetic disk without damaging the magnetic disk.

Figure 2:
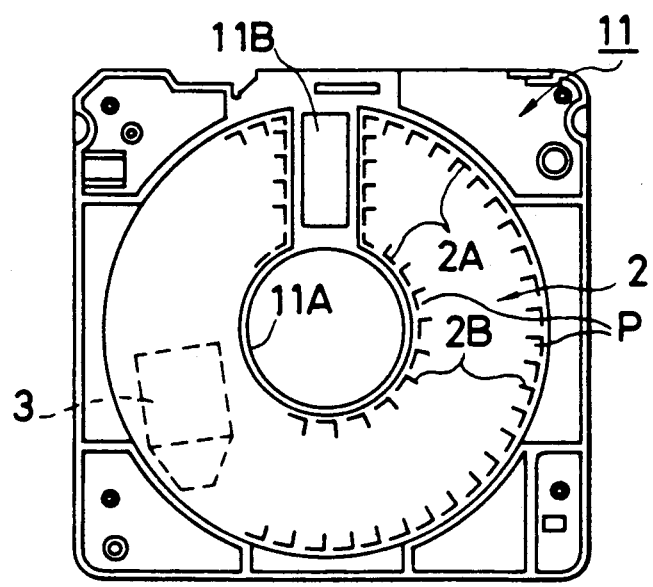
FIGS. 2, 3 and 4 are views similar to FIG. 1 and showing second, third and fourth embodiment of the magnetic disk cartridge according to the present invention.

Similarly, a magnetic disk cartridge of a second embodiment according to the present invention, as shown in FIG. 2, has a welding pattern P comprising a discontinuous line 2A and a straight line 2B intersecting with the line 2A as in the magnetic disk cartridge of the preceding embodiment. In this second embodiment, different from the preceding embodiment, the straight line 2B extends in a general vertical direction from one end of each line 2A to form as L-shaped configuration.

Accordingly, the same technical effect to that of the preceding embodiment can be expected on this embodiment.

Figure 3:
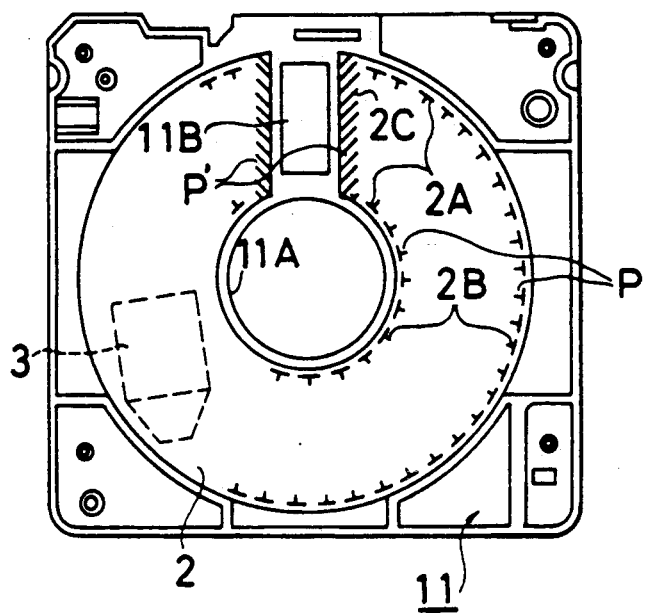

A third embodiment of a magnetic disk cartridge of the present invention, as shown in FIG. 3, is constructed as such that only a welding pattern P' in a welding area at an edge portion (the edge portion along the transducer access opening 11B) for intercommunication an internal edge portion and an external edge portion of the liner 2 is formed of a plurality of slant lines 2C arranged in parallel relation with each other. The welding pattern P at the external and internal edge portions of the liner 2 excluding the intercommunicating edge portion is formed in the same manner as the welding pattern P of the first embodiment.

Figure 4:
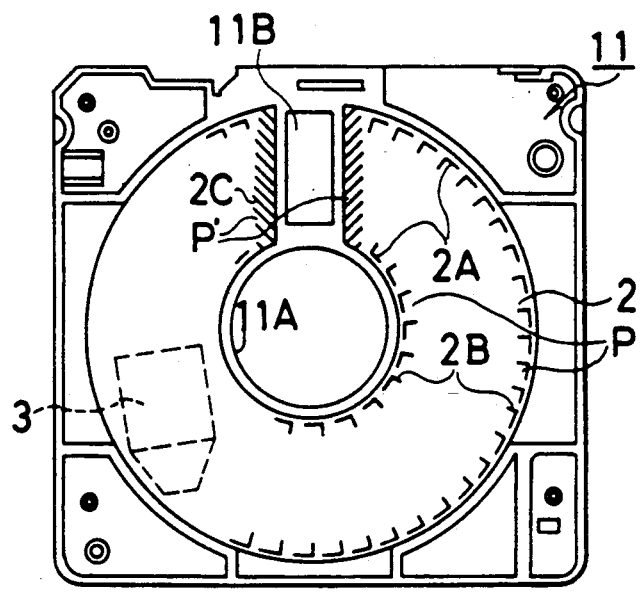
Figure 5:
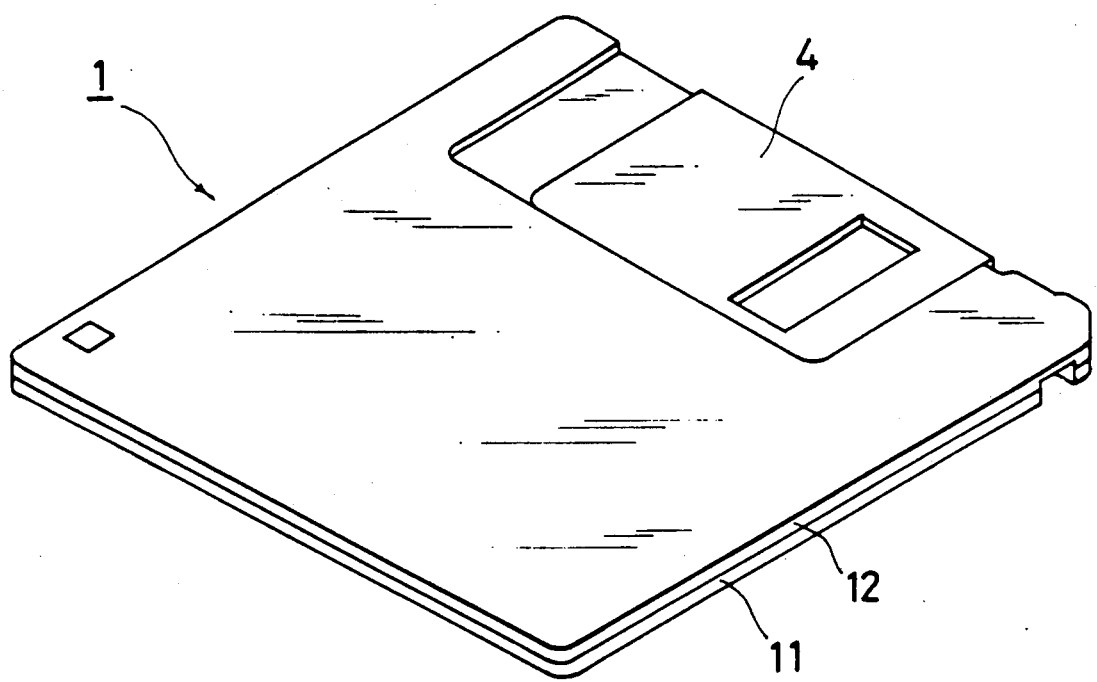
FIG. 5 is a whole perspective view showing a magnetic disk cartridge.
Figure 6:
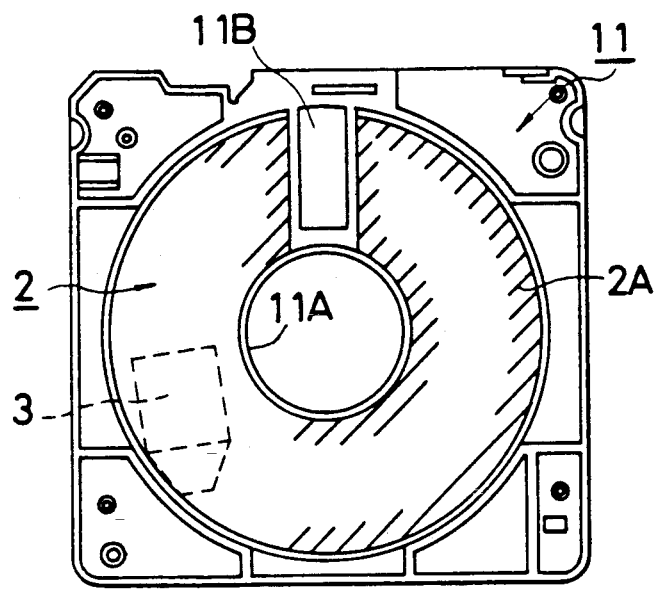
FIGS. 6 and 7 are plan views which show liner welding portions of conventional magnetic disk cartridges.
Figure 7:
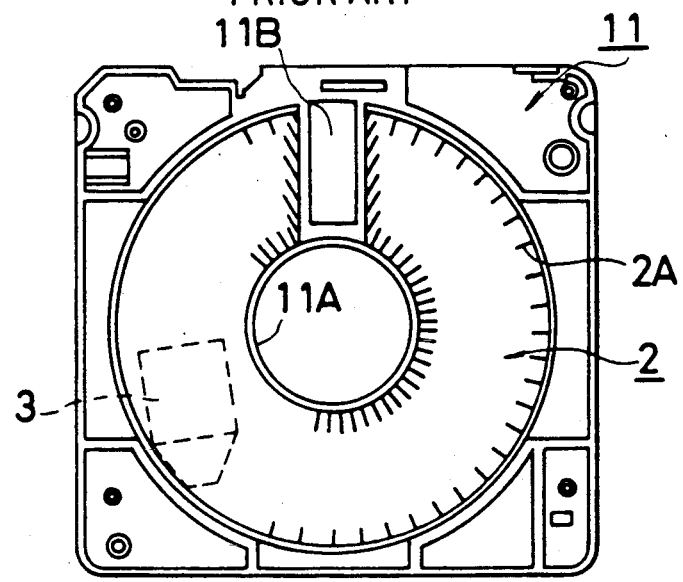

A fourth embodiment of the present invention, as shown in FIG. 4, is constructed as such that a welding pattern P' in a welding area at an edge portion for intercommunicating an internal edge portion and an external edge portion of the liner 2 is formed of a plurality of slant lines 2C arranged in parallel relation with each other as in the case with the third embodiment, and a welding pattern P at the internal and external intercommunicating edge portions excluding the edge portion is formed in the same manner as the welding pattern P of the second embodiment. A part of the welding pattern P' formed of the slant lines 2C may be disposed at the internal edge of the liner 2 as shown in FIG. 4.

The same technical effect as that of the first and second embodiment can be expected on the magnetic disk cartridges of the third and fourth embodiments.

In the above-mentioned various embodiments, the straight line 2B may be directed outwardly from each line of the discontinuous line 2A. Furthermore, in the above-mentioned various embodiments, the intersecting modes of the straight line 2B were generally perpendicular to each line of the discontinuous line 2A. However, it goes without saying that the pattern P may be formed such that the straight line is disposed at angles with respect to each line of the discontinuous line 2A, or a plurality of straight lines 2B are formed with respect to one line.

Although the present invention is mainly applicable to a 3.5 inches or smaller size magnetic disk cartridge, the size of the magnetic disk cartridge is not limited as long as it is not against the spirit of the present invention.

What is claimed is:
1. A magnetic disk cartridge comprising:
  a case, said case being formed from a cover member and a bottom member, each of said members having an interior surface and a substantially rectangular transducer access opening;
  a magnetic disk accommodated within said case, said disk being o-shaped and having a first and a second planar surface, an outer peripheral edge, an inner peripheral edge, at least one of said planar surfaces having an effective recording area extending from inward of said outer peripheral edge to outward of said inner peripheral edge; and
  a first and a second cleaner liner, said first liner being located between said first planar surface and said interior surface of said cover member, said second liner being located between said second planar surface and said interior surface of said bottom member, each of said liners having an exterior circumferential edge, interior circumferential edge, and a pair of intercommunicating edges, each of said intercommunicating edges connecting said exterior circumferential edge to said interior circumferential edge to form an opening generally corresponding to the dimensions of said rectangular transducer access opening, and said first and second liners being welded to said interior surface of said cover member and said bottom member, respectively, and being adapted to clean the corresponding planar surface of said magnetic disk, each of said liners being welded by a first welding pattern including a discontinuous line extending substantially parallel to and inwardly adjacent to said exterior circumferential edge and outwardly adjacent to said interior circumferential edge and at least one straight line intersecting with each portion of said discontinuous line, the length of each said straight line being limited such that each said straight line does not extend to overlay said effective recording area of said disk, and being welded by a second welding pattern, said second welding pattern being located along each of said intercommunicating edges.

2. The magnetic disk cartridge as claimed in claim 1, wherein said second welding pattern includes a discontinuous line extending substantially parallel to and inwardly adjacent to each of said intercommunicating edges and at least one straight line intersecting with each portion of said discontinuous line of said second welding pattern.

3. The magnetic disk cartridge as claimed in claim 2, wherein each of said first and second welding patterns is formed in a substantially T-shaped configuration.

4. The magnetic disk cartridge as claimed in claim 2, wherein each of said first and second welding patterns is formed in a substantially L-shaped configuration.

5. The magnetic disk cartridge as claimed in claim 2, wherein each of said first and second welding patterns is formed in a substantially ⊔-shaped configuration.

6. The magnetic disk cartridge as claimed in claim 2, wherein each of said first and second welding patterns is formed in a substantially ⊥-shaped configuration.

7. The magnetic disk cartridge as claimed in claim 1, wherein said second welding pattern in formed along each of said intercommunicating edges by a plurality of parallel lines oblique to said intercommunicating edges.

8. The magnetic disk cartridge as claimed in claim 7, wherein said first welding pattern is a substantially T-shaped configuration.

9. The magnetic disk cartridge as claimed in claim 7, wherein said first welding pattern is a substantially L-shaped configuration.

10. The magnetic disk cartridge as claimed in claim 7, wherein said first welding pattern is a substantially ⊔-shaped configuration.

11. The magnetic disk cartridge as claimed in claim 7, wherein said first welding pattern is a substantially ⊥-shaped configuration.

12. A magnetic disk cartridge comprising:
a case, said case being formed from a cover member and a bottom member, each of said members having an interior surface and a substantially rectangular transducer access opening, the longitudinal axis of said transducer access opening being coaxial with a radial line extending from the geometric center of said case;
a magnetic disk accommodated within said case, said disk being O-shaped and having a first planar surface, a second planar surface, an outer peripheral edge, an inner peripheral edge, at least one of said planar surfaces having an effective recording area located between a first and a second non-effective recording area, said first non-effective recording area extending inward from said outer peripheral edge and said second non-effective recording area extending outward from said inner peripheral edge; and
a first and a second cleaner liner, said first liner being located between said first planar surface and said interior surface of said cover member, said second liner being located between said second planar surface and said interior surface of said bottom member, each of said liners having a C-shaped configuration, the planar dimensions of each said liners substantially corresponding to the planar dimensions of said disk, said C-shaped configuration being formed by an exterior peripheral edge, an interior peripheral edge, and a pair of intercommunicating edges, each for said intercommunicating edges connecting said exterior peripheral edge to said interior peripheral edge to form an opening in said C-shaped configuration generally corresponding to the dimensions of said rectangular transducer access opening, and said first and second liners being welded to said interior surface of said cover member and said bottom member, respectively, and being adapted to clean the corresponding planar surface of said magnetic disk, each of said liners being welded by a first welding pattern including a discontinuous line extending substantially parallel to and inwardly adjacent to said exterior peripheral edge and outwardly adjacent to said interior peripheral edge and at least one straight line intersecting with each portion of said discontinuous line, the length of each said straight line being limited such that each said straight line does not extend to overlay said effective recording area of said disk, and being welded by a second welding pattern, said second welding pattern being located along each said pair of intercommunicating edges.

13. The magnetic disk cartridge as claimed in claim 12, wherein said second welding pattern includes a discontinuous line extending substantially parallel to and inwardly adjacent to each of said intercommunicating edges and at least one straight line intersecting with each portion of said discontinuous line of said second welding pattern.

14. The magnetic disk cartridge as claimed in claim 13, wherein each of said first and second welding patterns is formed in a substantially T-shaped configuration.

15. The magnetic disk cartridge as claimed in claim 13, wherein each of said first and second welding patterns is formed in a substantially L-shaped configuration.

16. The magnetic disk cartridge as claimed in claim 13, wherein each of said first and second welding patterns is formed in a substantially ⊔-shaped configuration.

17. The magnetic disk cartridge as claimed in claim 13, wherein each of said first and second welding patterns is formed in a substantially ⊥-shaped configuration.

18. The magnetic disk cartridge as claimed in claim 12, wherein said second welding pattern is formed along each of said intercommunicating edges by a plurality of parallel lines oblique to said intercommunicating edges.

19. The magnetic disk cartridge as claimed in claim 18, wherein said first welding pattern is a substantially T-shaped configuration.

20. The magnetic disk cartridge as claimed in claim 18, wherein said first welding pattern is a substantially L-shaped configuration.

21. The magnetic disk cartridge as claimed in claim 18, wherein said first welding pattern is a substantially ⊔-shaped configuration.

22. The magnetic disk cartridge as claimed in claim 18, wherein said first welding pattern is a substantially ⊥-shaped configuration.

* * * * *